Nov. 7, 1950 L. A. WILLIAMS 2,528,567
BASKET WEAVE CHAIN
Filed Jan. 31, 1947 2 Sheets-Sheet 1
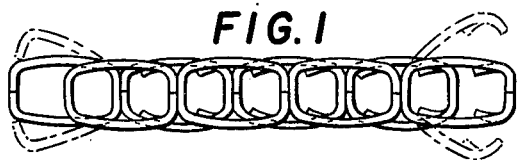
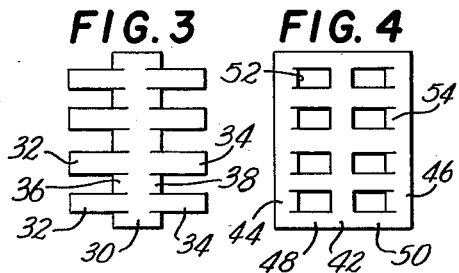
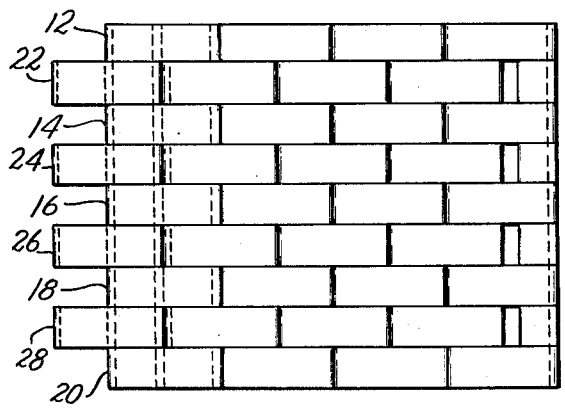
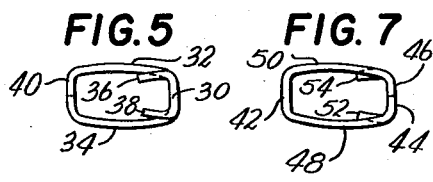
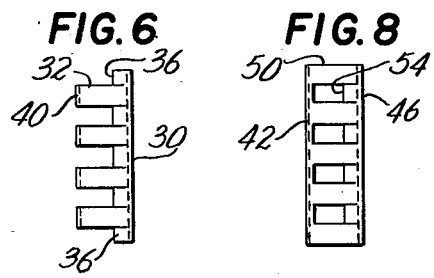
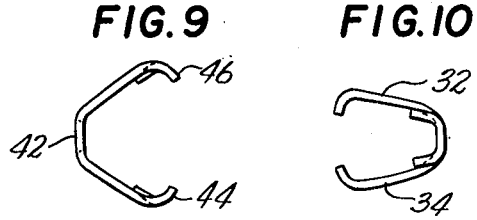
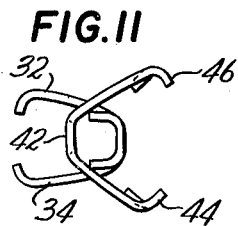
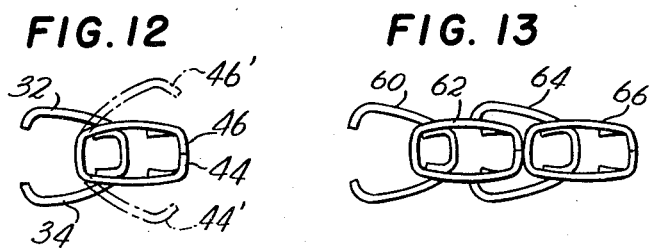
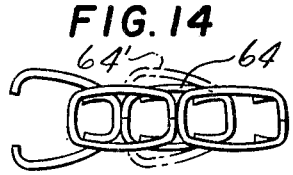
INVENTOR
LEON ALBERT WILLIAMS
BY James and Franklin
ATTORNEYS Nov. 7, 1950     L. A. WILLIAMS     2,528,567
BASKET WEAVE CHAIN
Filed Jan. 31, 1947     2 Sheets-Sheet 2
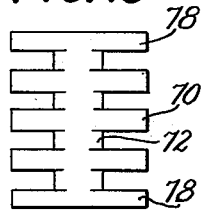
FIG. 15
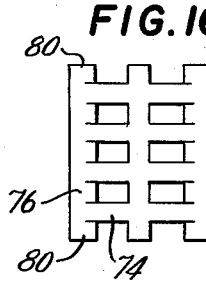
FIG. 16
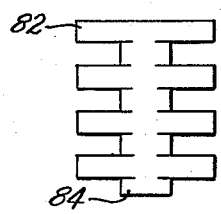
FIG. 17
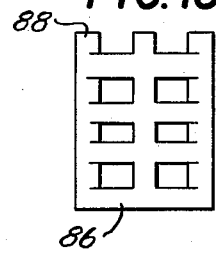
FIG. 18
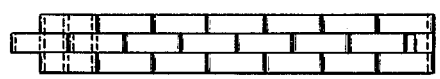
FIG. 19
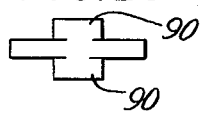
FIG. 20
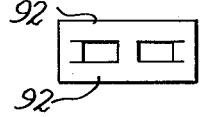
FIG. 21
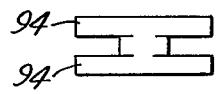
FIG. 22
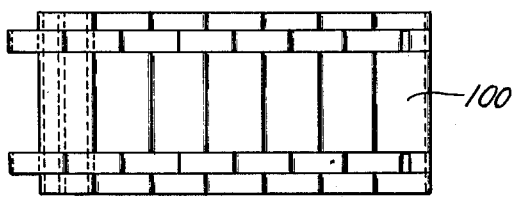
FIG. 24
FIG. 23
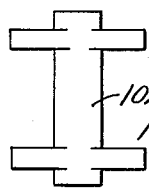
FIG. 25
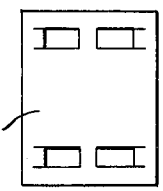
FIG. 26
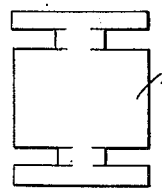
FIG. 27
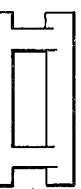
FIG. 28
INVENTOR
LEON ALBERT WILLIAMS
BY
ATTORNEYS Patented Nov. 7, 1950

2,528,567

UNITED STATES PATENT OFFICE 2,528,567

BASKET WEAVE CHAIN

Leon A. Williams, Waterbury, Conn., assignor to Benrus Watch Company, Inc., New York, N. Y., a corporation of New York Application January 31, 1947, Serial No. 725,565

16 Claims. (Cl. 59—80)

1

This invention relates to chains, especially jewelry chains of the basket-weave type, and more particularly to such a chain intended for use as a wrist watch strap.

A true basket weave chain is made up of a plurality of rows of small links, alternate rows having the links displaced relative to the intermediate rows, so that the chain when viewed from above has a formation somewhat resembling a basket weave. Such chains have been revived in popularity in a somewhat simplified and less expensive form, in which the links are made of sheet metal blanks which extend entirely across the width of the chain, said blanks including arms which in the finished chain simulate small links, but which in fact form parts of the larger link. Moreover, in modern form the cost of such chains has been further reduced by eliminating the need for pivot pins extending across the chain, and instead the parts of the blanks interlock in such fashion as to connect and pivot the links on one another.

In accordance with the current vogue, a close-mesh or basket weave is preferred, and it has been found that appropriate spacers may be formed on the blanks for increasing the overlap of one blank relative to another, so that the simulated small links or sub-links fill the surface of the chain. This gives the chain a solid and expensive appearance, and makes it far more difficult for the observer to detect the absence of pivot pins for hinging the parts of the chain together.

The primary object of the present invention is to generally improve basket weave chains. A further object is to strengthen and rigidify the individual links, and to strengthen the finished chain.

To accomplish the foregoing general objects, and other more specific objects which will hereinafter appear, my invention resides in the basket weave chain elements and their relation one to another, as are hereinafter more particularly described in the following specification. The specification is accompanied by drawings, in which:

Fig. 1 is an elevation showing one edge of a basket weave chain embodying features of my invention;

Fig. 2 is a plan view thereof;

Fig. 3 shows a male blank from which a male link may be formed;

Fig. 4 shows a female blank from which a female link may be formed;

Fig. 5 is an end view of a male link after the blank has been folded to close the link;

Fig. 6 is a plan view of the same;

2

Fig. 7 is an end view of a female link after the blank has been folded to close the link;

Fig. 8 is a plan view of the same;

Fig. 9 is an end view of the female link in open condition;

Fig. 10 is an end view of the male link in open condition;

Fig. 11 is an end view showing the male link assembled with the female link;

Fig. 12 is a similar view showing the female link closed to complete the assembly of one male and female link;

Figs. 13 and 14 show how such assemblies may be added in series to build up the chain;

Figs. 15 and 16 show modified mating male and female blanks, respectively;

Figs. 17 and 18 show modified mating male and female blanks, respectively;

Fig. 19 is a plan view of a modified narrow basket weave chain having only three rows of sub-links;

Figs. 20 and 21 respectively show mating male and female links for the chain of Fig. 19;

Figs. 22 and 23 show modified male and female links for the three-row chain of Fig. 19;

Fig. 24 is a plan view of a modified chain in which one row of sub-links is wider than the others;

Figs. 25 and 26 show mating male and female links for the chain of Fig. 24; and

Figs. 27 and 28 show modified male and female links for the chain of Fig. 24.

Referring to the drawing, and more particularly to Fig. 2, the basket weave chain extends horizontally, and only a small section of the chain is shown. It is simulatedly made up of rows of small links 12, 14, 16, 18 and 20 with alternate rows of small links 22, 24, 26 and 28, the alternate rows being displaced sidewardly to create the simulated basket weave formation. However, the links 12, 14, 16 etc. are really sub-links formed by arms on a single blank which is folded into a generally tubular link, and similarly, the links 22, 24, 26 etc. are really sub-links formed by arms on a blank which is folded to tubular formation. The large links extend all the way across the full width of the chain.

The chain is made up of alternate links which may for convenience be referred to as male and female links. Figs. 3 and 4 respectively show the sheet metal blanks from which the male and female links are formed. Referring to Fig. 3, the male link has a center cross-bar 30 with arms 32 and 34 projecting transversely therefrom. There are also spacers 36 and 38 on the cross-bar 30 between the arms 32 and 34. This blank is folded at the cross-bar 30 and at the ends of the arms to form a somewhat flattened tubular link, best shown in Figs. 5 and 6. This link has a bar 30 at one side, arms 32 projecting from the top of the bar 30, and arms 34 projecting from the bottom of the bar 30, the ends or tips of said arms being bent inwardly as indicated at 40 so that they come into abutting relation. Spacers 36 and 38 are also bent in the same general direction as the arms.

The female link shown in Fig. 4 has a center bar 42 and collaterally arranged edge bars 44 and 46. There are arms 48 and 50 extending between and connecting the bar 42 with the edge bars 44 and 46. There are also spacers 52 on edge bar 44 between the arms 48, and spacers 54 on edge bar 46 between the arms 50.

This blank is also folded to flattened tubular configuration, as shown in Figs. 7 and 8. It then comprises a center bar 42 on one side of the link and edge bars 46 and 44 on the other side of the link, with arms 50 extending from the top of the center bar 42 to the upper edge bar 46, and arms 48 (not visible in Fig. 8) extending from the bottom of the center bar 42 to the lower edge bar 44. The spacers 52 and 54 are located within the edge bars and between the arms, as is clearly shown in the drawing.

In building up the chain, pairs of links are preliminarily assembled as shown in Fig. 12. These assemblies are then put together to build up the complete chain. The manner in which a single pair of links is preliminarily assembled may be described with reference to Figs. 9 through 12 of the drawing. The blank of the female link is first bent to the relatively widely open section shown in Fig. 9. The male blank is preliminarily bent to the less open section shown in Fig. 10. The arms 32 of the male link are then passed between the edge bar 46 and the center bar 42 of the female link, and at the same time the arms 34 of the male link are passed between the edge bar 44 and the center bar 42 of the female link, the parts then coming into the relationship shown in Fig. 11. The widely-open female link is then closed, as shown by the change from the broken-line position 44', 46' to the solid-line position 44, 46 in Fig. 12. At this time the edge bars 44 and 46 have been brought into collateral abutting relation. The arms 32 and 34 of the male link are left open or spaced apart for the addition of a plurality of such assemblies in series.

This is illustrated in Figs. 13 and 14. In Fig. 13 one assembly comprises open male link 60 and closed female link 62. The other assembly comprises open male link 64 and closed female link 66. To combine these assemblies it is merely necessary to close the male link 64 about the edge bars and spacers of the closed female link 62. This is shown in Fig. 14 by the change from the dotted-line position 64' to the solid-line position 64. It will be understood that additional assemblies may be added in this fashion indefinitely for any desired length of chain.

The action of the spacers will also be clear from study of the drawing, for the spacers on the male links 60 and 64 hold the female links 62 and 66 in overlapping relation relative to the male links, and similarly, the spacers on female link 62 hold the male link 64 in overlapping relation. If desired, the sub-links of the male links may be brought into end-to-end contact (see Figs. 2 and 14), and the sub-links of the female links may be brought into end-to-end contact. This is done by making the spacers of proper dimension. If a slacker or more open-mesh chain is desired, it is merely necessary to shorten the spacers so as to permit some clearance between the ends of the simulated links.

As will be seen by reverting to Figs. 3, 4, 6 and 8, in the chain as so far described a side of the female link has an odd number of arms and an even number of spacers, and a side of the male link has an even number of arms and an odd numbers of spacers, the end-most arms being on the female link, and the end-most spacers being on the male link. However, it is not necessary to employ this arrangement, and a modification will be clear from examination of Figs. 15 and 16 of the drawing. Fig. 15 shows a male blank a side of which has an odd number of arms 70 and an even number of spacers 72, while Fig. 16 shows a mating female blank a side of which has an even number of arms 74 and an odd number of spacers 76. In this modification the endmost arms 78 are on the male link, and the endmost spacers 80 are on the female link.

Male and female blanks for still another modification are shown in Figs. 17 and 18 of the drawing. Both blanks have an even number of arms and an even number of spacers. The male link has arms 82 at one end and spacers 84 at the other end, and the female link similarly has arms 86 at one end and spacers 88 at the other end, but when the links are put together they are so oriented that the end spacers 84 of the male link come opposite the end arms 86 of the female link, and the end arms 82 of the male link come opposite the end spacers 88 of the female link.

As so far described, the chain is relatively wide, it having a width corresponding to nine rows of sub-links, as shown in Figs. 1 through 16, and eight rows of sub-links as shown in Figs. 17 and 18. For use with a ladies' wrist-watch, a relatively narrow band may be wanted, and such a band having a width of only three rows of sub-links is shown in Fig. 19. Mating male and female blanks for this chain are shown in Figs. 20 and 21. In this case the male blank has end spacers 90, and the female blank has end arms 92. A modified mating pair of blanks is shown in Figs. 22 and 23, the male blank of Fig. 22 having end arms 94, and the female blank of Fig. 23 having end spacers 96.

It will be seen that except for the marked reduction in the number of rows of sub-links, the construction is the same as that described before, the blanks of Figs. 3 and 4 corresponding to Figs. 20 and 21 respectively, and the blanks of Figs. 15 and 16 corresponding to Figs. 22 and 23, respectively. The blanks are folded and assembled in pairs, and the pairs are then combined, as has already been described.

It is not necessary for all of the sub-links to have equal width. Some rows may be wider, and some narrower. One such chain is shown in Fig. 24, in which the center row 100 appears to be made of wide links, while the marginal rows appear to be made of narrow links. This chain may be built up of mating male and female blanks of the type shown in Figs. 25 and 26. The male blank of Fig. 25 has wide spacers 102 at the center, while the female blank of Fig. 26 has wide arms 104 at the center. These blanks correspond respectively to the blanks of Figs. 3 and 4, and are folded up and assembled in exactly the same fashion as was previously described.

A modified pair of mating male and female blanks which may be used to form the chain of Fig. 24, is shown in Figs. 27 and 28. The male blank of Fig. 27 has wide arms 106 at the center, while the female blank of Fig. 28 has wide spacers 108 at the center. These blanks correspond respectively to the blanks shown in Figs. 15 and 16. They are folded and assembled in pairs, and the pairs are then built up to form the chain, all as previously described.

It will be understood that other variations in width of the sub-links may be made, to produce chains of different appearance. For example, three narrow rows may be employed, one at each edge and one at the center of the chain, with two wider rows located between the narrow rows.

In all cases the common requirement for mating is that the arms of the male link come opposite the spacers of the female link, and vice versa. A further requirement when dealing with rows of different width, is that the arms of the male blank have the same width as the mating spacers of the female blank, and vice versa.

It will be noted that in all cases, alternate links are female links which have not only a center bar, but also edge bars connecting what would otherwise be the free ends of the arms of the link. The female links are obviously rigidified and strengthened by the edge bars which prevent lateral displacement of the ends of the arms, and this in turn safeguards the male links against lateral deformation of the arms, for the said arms are anchored between the arms of the female links.

It is believed that the construction and method of assembly of the basket weave chain of my invention, as well as the advantages thereof, will be apparent from the foregoing detailed description. It will also be apparent that while I have shown and described my invention in several preferred forms, changes may be made in the structures disclosed without departing from the spirit of the invention, as sought to be defined in the following claims.

I claim:

1. A basket weave chain made up of male and female links connected in alternation, each male link being a folded sheet metal blank having only one cross-bar with arms projecting transversely therefrom, each female link being a folded sheet metal blank having collateral center and edge bars with transverse arms connecting said bars, said blanks being folded or bent to form interlocked tubular-like links extending transversely of the chain, the aforesaid arms of the blanks forming rows of sub-links extending longitudinally of the chain in basket weave formation.

2. A basket weave chain made up of male and female links connected in alternation, each male link being a folded sheet metal blank having a center cross-bar with arms projecting transversely therefrom and spacers on said cross-bar between said arms, each female link being a folded sheet metal blank having collateral center and edge bars with transverse arms connecting said bars and with spacers on said edge bars between said arms, said blanks being folded or bent to form interlocked tubular-like links extending transversely of the chain, the aforesaid arms of the blanks forming rows of sub-links extending longitudinally of the chain in basket weave formation.

3. A basket weave chain made up of male and female links connected in alternation, each male link having a bar at one side and arms projecting from the top and bottom of the bar, each female link having a center bar at one side, edge bars at the other side, arms projecting from the top of the center bar to the upper edge bar, arms projecting from the bottom of center bar to the lower edge bar, the arms of the male link passing between the edge bars and the center bar of a female link with the arms of both links pointing away from each other.

4. A basket weave chain made up of male and female links connected in alternation, each male link having a bar at one side and arms projecting from the top and bottom of the bar, each female link having a center bar at one side, collaterally abutting edge bars at the other side, arms projecting from the top of the center bar to the upper edge bar, arms projecting from the bottom of center bar to the lower edge bar, the arms of the male link passing between the edge bars and the center bar of a female link with the arms of both links pointing away from each other, the ends of the arms of the male link being bent inwardly around the edge bars of another female link.

5. A basket weave chain made up of male and female links connected in alternation, each male link having a bar at one side and arms projecting from the top and bottom of the bar with spacers at the bar between the arms, each female link having a center bar at one side, edge bars at the other side, arms projecting from the top of the center bar to the upper edge bar, arms projecting from the bottom of the center bar to the lower edge bar, and spacers at an edge bar between the arms, the arms of the male link passing between the edge bars and the center bar of a female link with the arms of both links pointing away from each other.

6. A basket weave chain made up of male and female links connected in alternation, each male link having a bar at one side and arms projecting from the top and bottom of the bar with spacers at the bar between the arms, each female link having a center bar at one side, collaterally abutting edge bars at the other side, arms projecting from the top of the center bar to the upper edge bar, arms projecting from the bottom of center bar to the lower edge bar, and spacers at the edge bars between the arms, the arms of the male link passing between the edge bars and the center bar of a female link with the arms of both links pointing away from each other, the ends of the arms of the male link being bent inwardly around the edge bars and spacers of another female link.

7. An assembly of one male and one female link for use in building up a basket weave chain, the male link of said assembly having a bar at one side and arms projecting from the top and bottom of the bar, said female link having a center bar at one side, top and bottom edge bars at the other side, arms projecting from the top of the center bar to the top edge bar and from the bottom of the center bar to the bottom edge bar, the arms of said male link passing between the edge bars and the center bar of the female link with the arms of both links pointing away from each other, the female link being closed in tubular formation by bringing the edge bars into collateral abutting relation, the arms of said male link being turned inwardly at the end but being left open or spaced apart for the addition of a plurality of such assemblies in series.

8. An assembly of one male and one female link for use in building up a basket weave chain, the male link of said assembly having a bar at one side and arms projecting from the top and bottom of the bar with spacers on said bar between said arms, said female link having a center bar at one side, top and bottom edge bars at the other side, arms projecting from the top of the center bar to the top edge bar and from the bottom of the center bar to the bottom edge bar, spacers on an edge bar between the arms, the arms of said male link passing between the edge bars and the center bar of the female link with the arms of both links pointing away from each other, the female link being closed in tubular formation by bringing the edge bars into collateral abutting relation, the arms of said male link being turned inwardly at the end but being left open or spaced apart for the addition of a plurality of such assemblies in series.

9. A basket weave chain as defined in claim 2, in which a side of the female link has an odd number of arms and an even number of spacers, and in which a side of the male link has an even number of arms and an odd number of spacers, the endmost arms being on the female link, and the endmost spacers being on the male link.

10. A basket weave chain as defined in claim 5, in which a side of the female link has an odd number of arms and an even number of spacers, and in which a side of the male link has an even number of arms and an odd number of spacers, the endmost arms being on the female link, and the endmost spacers being on the male link.

11. A basket weave chain as defined in claim 2, in which a side of the female link has an even number of arms and an odd number of spacers, and in which a side of the male link has an odd number of arms and an even number of spacers, the endmost arms being on the female link, and the endmost spacers being on the male link.

12. A basket weave chain as defined in claim 5, in which a side of the female link has an even number of arms and an odd number of spacers, and in which a side of the male link has an odd number of arms and an even number of spacers, the endmost arms being on the female link, and the endmost spacers being on the male link.

13. A basket weave chain as defined in claim 2, in which the female link has arms at one end and spacers at the other end, and in which the male link has spacers at one end and arms at the other end, said links being so oriented that the end spacers of the male link come opposite the end arms of the female link and the end arms of the male link come opposite the end spacers of the female link.

14. A basket weave chain as defined in claim 5, in which the female link has arms at one end and spacers at the other end, and in which the male link has spacers at one end and arms at the other end, said links being so oriented that the end spacers of the male link come opposite the end arms of the female link and the end arms of the male link come opposite the end spacers of the female link.

15. A basket weave chain as defined in claim 2, in which some arms are wider than others, and in which the spacers of the male link correspond to the width of the arms of the female link, and in which the spacers of the female link correspond in width to the arms of the male link, whereby the finished chain appears to have rows of sub-links at least one row of which differs in width from that of the others.

16. A basket weave chain as defined in claim 5, in which some arms are wider than others, and in which the spacers of the male link correspond to the width of the arms of the female link, and in which the spacers of the female link correspond in width to the arms of the male link, whereby the finished chain appears to have rows of sub-links at least one row of which differs in width from that of the others.

LEON A. WILLIAMS.

REFERENCES CITED

The following references are of record in the file of this patent:

UNITED STATES PATENTS

| Number | Name | Date |
|---|---|---|
| 1,795,039 | Preslinari | Mar. 3, 1931 |
| 1,822,393 | Fassnacht et al. | Sept. 8, 1931 |